United States Patent [19]

Parker

[11] Patent Number: 5,528,402

[45] Date of Patent: Jun. 18, 1996

[54] ADDRESSABLE ELECTROHOLOGRAM EMPLOYING ELECTRO-OPTIC LAYER AND PATTERNED CONDUCTOR BETWEEN TWO ELECTRODES

[76] Inventor: William P. Parker, Box 1115 Rte. 100, Waitsfield, Vt. 05673

[21] Appl. No.: 332,650

[22] Filed: Feb. 7, 1994

[51] Int. Cl.$^6$ ............................ G02F 1/133; G02F 1/1343
[52] U.S. Cl. .................... 359/87; 359/95; 359/79; 359/3; 359/7
[58] Field of Search ........................ 359/87, 79, 36, 359/95, 9, 15, 11, 32, 3, 4, 6, 7

[56] References Cited

U.S. PATENT DOCUMENTS

| | | | |
|---|---|---|---|
| H738 | 2/1990 | McManus et al. | 350/3.7 |
| 4,850,682 | 7/1989 | Gerritsen | 350/348 |
| 4,904,063 | 2/1990 | Okada et al. | 350/347 V |
| 4,938,568 | 7/1990 | Margerum et al. | 350/334 |
| 4,970,129 | 11/1990 | Ingwall et al. | 430/1 |
| 5,096,282 | 3/1992 | Margerum et al. | 359/3 |
| 5,111,313 | 5/1992 | Shires | 359/17 |
| 5,151,724 | 9/1992 | Kikinis | 359/17 |
| 5,172,251 | 12/1992 | Benton et al. | 359/9 |
| 5,191,449 | 3/1993 | Newswanger | 359/22 |
| 5,198,912 | 3/1993 | Ingwall et al. | 359/3 |
| 5,258,860 | 11/1993 | Schehrer et al. | 359/11 |
| 5,285,308 | 2/1994 | Jenkins et al. | 359/11 |
| 5,379,131 | 1/1995 | Yamazaki | 359/2 |
| 5,426,521 | 6/1995 | Chen et al. | 359/32 |

OTHER PUBLICATIONS

W. P. Parker "Output Devices for Electro–Holography" SPIE Proc. vol. 1667 Practical Holography VI, (1992).
S. Bains "Holographic Optical Elements–New LCD Makes Switchable Holograms" *Laser Focus World*, Jun. 1993 (pp. 45–49).
Diffraction Limited Press Release to S. Bains, *Laser Focus World* Feb. 17, 1993.

*Primary Examiner*—Rodney B. Bovernick
*Assistant Examiner*—Kenneth Parker
*Attorney, Agent, or Firm*—Theodore R. Touw

[57] ABSTRACT

An electrically addressable wavefront-modulation device has a thin film of transparent conductive material finely patterned as a hologram in which individual fringe elements need not have electrical continuity with each other or with external electrodes. The holographic pattern is covered with a transparent dielectric whose refractive index preferably matches that of the patterned material. An electro-optic layer varies in refractive index depending on application of a voltage to transparent conductive electrodes, one on each side of the device area to be addressed. The hologram's diffraction efficiency may be varied at high frequency. Thus the electrohologram is addressed by area or field rather than by element or matrix addressing. The electro-optic layer may be liquid crystal material. Preferred embodiments have T-shaped structures formed by subetching under each fringe element. Other preferred embodiments have displacement spacers between conductive fringe elements, displacing electro-optic material from inter-fringe spaces. The addressable electroholograms are fabricated by a process compatible with semiconductor wafer fabrication. A number of such electroholograms may be combined in stacked or coplanar combinations to perform various wavefront modulation functions.

29 Claims, 8 Drawing Sheets

ADDRESSABLE ELECTROHOLOGRAM EMPLOYING ELECTRO-OPTIC LAYER AND PATTERNED CONDUCTOR BETWEEN TWO ELECTRODES

BACKGROUND OF THE INVENTION

1. Field of the Invention

This invention relates generally to holography and in particular to holograms, holographic optical elements, and other wavefront-modulating structures capable of being addressed and controlled electrically. This invention relates also to methods of fabricating such holograms, holographic optical elements, and wavefront-modulating structures.

2. Description of Related Art

For nearly three decades, there has been a need for electrically controllable holograms, especially holograms that can be controlled at high speeds. A major objective of holography research and development has been realization of apparatus for three-dimensional dynamic displays. Such displays would find use in holographic stereoscopic motion pictures or television and many other display applications. In an article published in 1965, Leith et al. "Requirements for a Wavefront Reconstruction Television Facsimile System" J. SMPTE Vol. 74 (1965), the requirements for dynamic holographic displays were enunciated. In 1969, referring to the information content requirements of holograms, W. E. Kock stated that" . . . the outlook for using holograms in television is very bleak." (W. E. Kock "Lasers and Holography" Doubleday & Company 1969, reprinted by Dover Publications 1981).

More recently a real-time dynamic holographic display was constructed and operated (St. Hilaire et al. "Real-time Holographic Display: Improvements Using a Multichannel Acousto-optic Modulator and Holographic Optical Elements" *Practical Holography V, SPIE Vol.* 1461, (1991) Pages 254–261).

A number of different technologies have been applied to the problem of dynamic holographic displays. The field was reviewed by the present inventor (W. P. Parker "Output Devices for Dynamic Electronic Holography" Master's Thesis, Massachusetts Institute of Technology Media Laboratory, January 1989). (See also W. P. Parker "Output Devices for Electro-Holography" SPIE Proceedings Vol. 1667, *Practical Holography VI*, San Jose, Calif. 1992.) That research resulted in descriptions of numerous technologies that might be used in output apparatus for holography. Such apparatus has been denoted by several names including Electrically Addressed Hologram (EAH), Dynamic Electronic Hologram (DEH), and most recently the Electronic Hologram or Electrohologram (EH). An addressable electrohologram may be abbreviated AEH. The latter terminology will be adopted for the invention of the present application. The terms "addressable electrohologram" and "electrically addressable hologram"are used interchangeably in this specification and in the appended claims. These terms are also used herein to denote any wavefront-modulating device controlled by electrical means, whether the device carries a holographic image or a non-image wavefront-modulating structures are equivalent to holograms. For example a linear diffraction grating of uniform pitch acts as a hologram of a plane wave.

Dynamic holographic displays use primarily image-bearing holograms. Besides dynamic holographic displays, electroholograms are useful for other non-image bearing applications examples are beam steering modifying, or modulating tasks for holographic or non-holographic optical memory, for optical computers, for optical correlators for scanning (such as bar code scanners), for bariable-parameter holographic optical elements (HOE's)(such as variable-power or zoom lens systems, or variable spectroscopic gratings), for spatial light modulating devices (such as page composers and light valves), for visible laser diode arrays, and for integrated optic applications. Many of these applications required a device with high space-bandwidth product, ranging from $10^3$ to $10^{10}$ or higher.

U.S. Statutory Invention Registration H738 (McManus et al. 1990) discloses switching of beams among a number of holograms for reconfigurable optical interconnections. This device utilizes an array of optical switches which direct a set of combination of a twisted-nematic liquid crystal cell and a polarizing beam splitter. The holograms themselves are not switched.

U.S. Pat. No. 4,850,682 (Gerritsen et al., 1991) discloses diffraction grating structures in which at least one topographic-relief diffraction grating is placed in contact with a liquid crystal material having substanially the same refractive index as the grating when the liquid crystal is in an inactivated state, but having a substantially different refractive index when the liquid crystal is in an activated state. When the liquid crystal is in an inactivated state, light incident on the structure passes through the structure and exits in a direction subtantially unchanged from its incident direction. When the liquid crystal is activated with an electric field such incident light is diffracted in a new direction. There is a direct electrical connection to each element or set of elements used for activating the liquid crystal.

U.S. Pat. No. 5,096,282 (Margerum et al., 1992) discloses polymer dispersed liquid crystal (PDLC) film devices including special types forming gratings and holograms. The grating and hologram films are obtained by periodically varying the conditions of polymerization over the film to produce a corresponding periodic spatial variation in liquid crystal bubble size. Since there are correlations between the liquid crystal bubble size and the resulting film's threshold and operating voltages for optical transmission,the grating or hologram films are capable of time modulation by applied voltages. The operation of such films depends on light scattering from the liquid crystal bubbles.

U.S. Pat. No. 5,111,313 (Shires, 1992) shows an electronically modulated holographic autosteroescope utilizing a cylindrical holographic optical element which is spun about its axis by a motor. The holographic optical element comprise two different hologram directs each raster scan out of the cylinder at a specified angle. In this type of display, the holograms are not tatic, as they are spinning, but the modulation that produces a display of dynamic information is achieved by modulating the laser beam light source.

U.S. Pat. No. 5,151,724 (Kikinis, 1992) and U.S. Pat No. 5,266,531 (1993) disclose a dynamic holographic display in which the hologram itself is modulated electro-mechanically. It has an array of reflective surfaces formed on cantilevered structures substantially parallel to the surface of a substrate, such as a silicon wafer. Electrical currents are used to position the individual reflective surfaces in the array so the topography forms a hologram, and reflected light forms a holographic image. In fabricating such a display, the lithographic techniques used must of course have sufficient resolution to form cantilevered structures spaced at a punch appropriate to the desired hologram.

U.S. Pat. No. 5,172,251 (Benton st al., 1992) discloses a three-dimensional display system using an acousto-optic modulator, various lenses, and horizontal and vertical scanners. A data processing system sends signals encoding a diffraction pattern to the acousto-optic modulator which generates a three-dimensional image such as a holographic image.

U.S. Pat. No. 5,191,449 (Newswanger, 1993) discloses an animated holographic stereogram display in which a hologram contains a plurality of stereographic image pairs, and a user views the hologram from a fixed relative position. A plurality of light sources are spatially dispersed and operated in appropriate time sequencing to animate the image pairs. This is an example of several dynamic holographic displays in which electrical control is used to control one or more light sources, while the holograms themselves are static.

U.S. Pat. No. 5,198,912 (Ingwall et al., 1993) discloses a volume phase hologram with liquid crystal material filling microvoids between the holographic interference fringes formed in a material having a different index of refraction. The diffraction efficiency of such composite volume phase holograms may be varied, e.g. by application of an electric field.

While the holographic displays described above are useful for many of the desired purposes, there exists a need for electrically addressable holographic elements specifically aimed at high frequency operation for real-time applications, and capable of being fabricated by methods compatible with semiconductor wafer processing, for eventual integration with VLSI or ULSI semiconductor electronics such as the wafer-scale electrohologram envisioned in the present inventor's 1989 thesis mentioned above. There is also a need for addressable wavefront-modulating devices that are substantially planar and very thin. Thin structures are especially needed so that combinations in stacked structures will have practical total thickness. There is especially a need for electrically addressable wavefront-modulating devices that do not require direct electrical connection to each fringe or diffracting element, that do not require electrical continuity among the fringes or diffracting elements of a pattern, and that operate at high frequencies.

In manufacture of ordinary conventional liquid crystal displays such as alphanumeric displays, the elements forming alphanumeric characters are made with dimensions of elements and their spacings (typically with spatial frequencies much greater than 100 cycles per millimeter) that enable them to be easily visible by the display user. The individual segments or pixels of such conventional liquid crystal displays are also individually addressed, each being connected to an electrical drive line that can be switched to turn the segment or pixel on or off. These may be described as element-addressed or matrix-addressed. In contrast to such liquid crystal displays, an addressable electrohologram requires modulating elements at considerably higher spatial frequencies, typically more than 100 cycles per millimeter, to produce the desired diffraction effects on incident light. Since holograms often consist of many small elements without continuity among the elements, an addressable electrohologram can also benefit from area addressing or field addressing instead of the element addressing or matrix addressing of conventional liquid crystal displays. Thus a device capable of being addressed over an area or field containing many discontinues small diffracting elements is especially useful.

NOTATIONS AND NOMENCLATURE

In this specification, the following terms or abbreviations are used with the meanings listed here:

AEH—Addressable electrohologram or addressable wavefront-modulating device.
CPM—Cycles per millimeter, units of spatial frequency
DE—Diffraction efficiency
HOE—Holographic optical element.
ITO—Indium-doped tin oxide.
LC—Liquid crystal.
Pitch—The spatial cycle dimension of a periodic structure. If the structure is thought of as a combination of lines and spaces, pitch is defined as a line width plus a space width.
RC—Resistance-capacitance combination.

SUMMARY OF THE INVENTION

The present invention comprises an electrohologram apparatus having addressable diffraction elements and a fabrication process for such an apparatus. The electrohologram device operates in a switching manner utilizing transmission holographic recordings of any size by applying electric fields to one or more transparent electrode structures underlying a suitable modulating material. This device structure is applicable to all existing formats for transmission holograms and can be adapted for use with reflection holograms. The pattern need not be an image-bearing hologram, but can be any wavefront-modulating structure. As no direct electrical connection is needed to the wavefront-modulating structure, and electrical continuity among the individual "fringes" or diffracting features of the pattern is not required, the device is capable of modulating complex patterns that do not have such continuity.

Several such wavefront-modulating structures can be stacked to provide many combinations of functions. For example several addressable holographic lenses can be stacked to provide a combination lens of variable effective focal length determined by addressing selected HOE's in the stack. Alternatively, several wavefront-modulating structures can be disposed in a coplanar array to combine their functions. For example a number of coplanar diffracting elements can be combined to diffract an incident plane wave into a number of different output directions determined by which element or elements in the array are addressed.

The fabrication method uses equipment that is conventional for semiconductor processing to produce three or more embodiments of the electrohologram structure. The simplest embodiment has planar geometry for all layers. It is fabricated by methods similar to those used for liquid crystal display panels except for an additional homogeneous transparent conductive coating spaced from the electrode pattern layer by an additional thin dielectric layer. An alternate embodiment of the structure that incorporates an undercut of the electrode patterns is referred to as a "T-cell" construction, which requires an alternative fabrication method. Yet another embodiment has a cell design which incorporates spacers to displace the liquid crystal in non-patterned areas and to act as fringe field barriers. The latter embodiment is fabricated using a method including a backside illumination step.

DETAILED DESCRIPTION OF THE PREFERRED EMBODIMENTS

Addressable Electrohologram Structures

Addressable electrohologram (AEH) structures are described here in terms of three preferred embodiments, starting with the simplest. The following descriptions will be more clearly understood by reference to the accompanying drawing figures.

Figure 1:
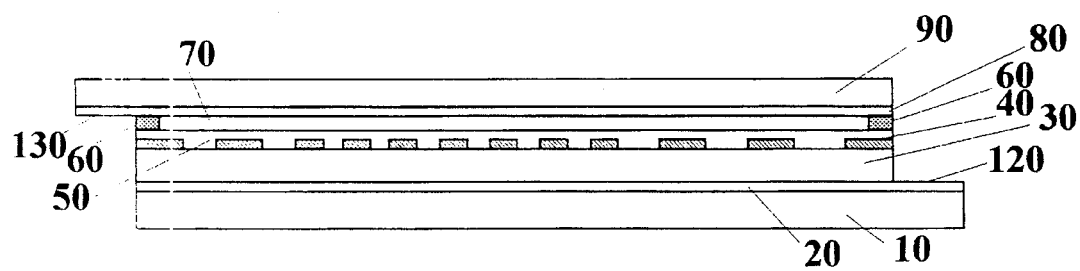
FIG. 1 is a cross-section view illustrating a simple embodiment of an addressable electrohologram.

FIG. 1 illustrates schematically a representative cell of a simple embodiment of an AEH structure, essentially comprising a stack of layers of various materials serving various purposes in the AEH structures. In order to clarify the spatial and functional relationships of the major elements of the AEH structures described, some physical elements used in practical fabrication and/or operation of the AEH are not shown in the drawings: diffusion barriers, an alignment layer, driving electronics, and coupling optics. These elements are described below in this specification.

The structure of FIG. 1 has a flat transparent substrate 10 which supports the remaining elements. Substrate 10 may be flat glass or quartz, for example. A substantially transparent conductive layer 20 covers substrate 10. A dielectric layer 30 covers conductive layer 20. A patterned electrically-conductive layer 40 carrying the pattern of a desired hologram is the next layer in the stack of layers. Depending on the type of hologram patterned, layer 40 may comprise many discontinues coplanar fringes separated by fringe spaces, i.e. there may be little or no electrical continuity among the many fringe elements of the pattern of layer 40. In an especially simple case, such as a linear diffraction grating, the patterned planar layer 40 may be arranged to have electrical continuity throughout, but the operation of the AEH of the present invention does not require such continuity. Because no ohmic electrical connection to the hologram pattern is used, the deleterious effects of process-induced gaps and bridges among elements of the pattern are reduced.

The hologram pattern as a whole spans a predetermined portion of the area of the AEH. A planarization layer 50 covers the pattern elements of layer 40 and produces a more planar top surface for the next layer. Seals 60 surround a predetermined portion of the surface of planarization layer 50, including the portion of layer 50 covering the patterned portion of patterned layer 40. A layer 70 of suitable electro-optical material such as homogeneous non-scattering liquid crystal material covers the portion of layer 50 surrounded by seals 60, which serve to retain electro-optical material within the AEH. A substantially transparent conductive layer 80 is adjacent to electro-optical material layer 70. A substantially transparent cover 90 covers and protects the entire preceding stack of layers. Electrical contact areas 120 and 130 provide electrical contacts from conductive layers 20 and 80 respectively to external electrical driving means (not shown). It is important to note that there is no direct ohmic connection between the conductive material of patterned layer 40 and the electrical driving means. In operation of the AEH, the individual elements of patterned layer 40 are charged by capacitive coupling from conductive layer 20 across thin dielectric layer 30. It will be appreciated that an AEH may have multiple cells in which conductive layers 20 and 80 and corresponding contact areas 120 and 130 of different cells are electrically separate and distinct.

The materials of layers 30, 40, and 50 are preferably materials with matching refractive index, matching also the refractive index of electro-optical material of layer 70 in its normal state with no voltage applied to the AEH. Electro-optical material of layer 70 can be any one of a number of materials whose optical properties can be changed electrically. Such materials include lithium niobate, various electro-optical polymers, ferroelectric materials, various types of liquid crystal materials, and so on. In order to describe an embodiment with sufficient detail, electro-optical layer 70 will be described in terms of the embodiment using liquid crystal material for layer 70.

If liquid crystal material is used for layer 70, a few specific practical modifications are needed, as will be apparent to those skilled in the art of liquid crystal display fabrication. For example diffusion barriers may be required to prevent the migration of mobile ions such as sodium from the substrate into the liquid crystal material. For proper operation (especially at low voltages and high speeds), the liquid crystal must remain highly resistive, and therefore the material must have extremely low ion content. For quartz or silicon substrates of high purity, no diffusion barrier is usually needed. For glass substrates, a thin (e.g. 50 Å–100 Å) silicon monoxide (SiO) film is a sufficient diffusion barrier.

Some liquid crystal materials applied to some substrates may also require use of an alignment layer at the interface to orient the liquid crystal molecules. For example cholesteric liquid crystals are likely to require an alignment layer. In some of the devices made to test the present invention, no alignment layer was needed as the liquid crystal material aligned spontaneously. When an alignment layer was used, a thin film of polyimide or silicon dioxide ($SiO_2$) modified by mechanical rubbing with a soft cloth was sufficient. For example a thin film of polyimide 350 Å to 850 Å thick, cured at high temperature and rubbed in one direction with lint-free polyester clean room wipe performed well as an alignment layer.

In a preferred embodiment, substrate 10 is "master grade" polished quartz photo mask substrate; conductive layers 20 and 80 and patterned layer 40 are indium-doped tin oxide (ITO); dielectric layer 30 and planarization layer 50 are polyimide; and cover 90 is quartz. Dielectric layer 30 and planarization layer 50 (either or both) may alternatively be $Al_2O_3$, $Ta_2O_5$, or SiN, for example, or other material with sufficiently well-matched refractive index. Seals 60 may be any of a number of insulating materials such as two-part epoxies, ultraviolet-light-cured epoxies or polyimides.

Figure 2:
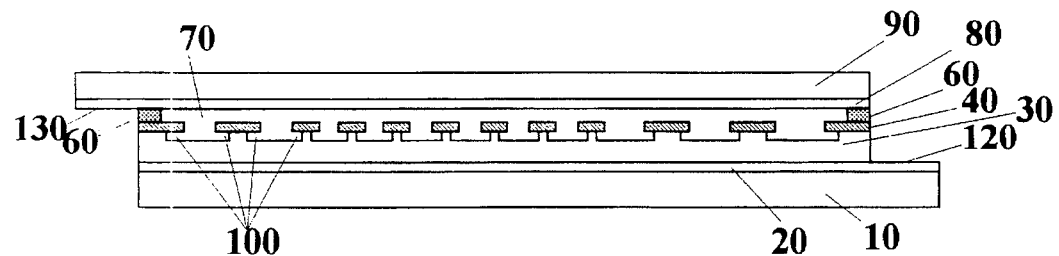
FIG. 2 is a cross-section view illustrating a preferred embodiment of an addressable hologram.

FIG. 2 shows a preferred embodiment of an AEH, having a "T-cell" structure. The layers shown in FIG. 2 have the same identities and functions as corresponding elements in FIG. 1, except that subetch regions 100 are etched into dielectric layer 30, creating substructures with T-shaped cross-sections. The tops of these T-shaped cross-sections comprise local elements of patterned layer 40, and the stems of the T-shapes comprise remaining unetched portions of dielectric layer 30. The effects of using a "T-cell" embodiment instead of the simpler, substantially planar embodiment of FIG. 1 are at least twofold: firstly, the undercut regions 100 act as phase-shifting structures, which augment the binary amplitude pattern of patterned layer 40 with an additional phase modulation; secondly, the undercut regions 100 act as a second cell aligned to the normal patterned structure. Thus this structure has the potential of allowing additional levels of index modulation in a single structure. Under some operating conditions, the "T-cell" structure has sharply increased high frequency response.

Figure 3:
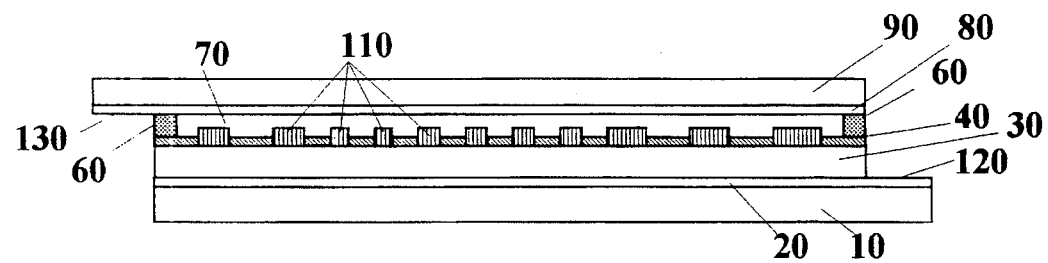
FIG. 3 is a cross-section view illustrating another preferred embodiment of an addressable hologram.

FIG. 3 shows a third preferred embodiment of an AEH. Again the elements shown in FIG. 3 are the same as corresponding elements of FIG. 1, except that in FIG. 3 displacement structures 110 fill lateral spaces between the individual elements of patterned layer 40. The purpose of displacement structures 110 is to displace liquid crystal material from the non-patterned areas (i.e. the spaces between hologram pattern fringes), and to act a fringe field barriers. Thus in this embodiment, there is no liquid crystal material between adjacent hologram fringe features of patterned layer 40.

Each of these three designs could potentially utilize the thin dielectric layer 30 immediately under the electrode pattern as an illumination wave guide which would allow the hologram to be reconstructed via evanescent wave illumination. Some modifications to the cell design and operating mode may be required to optimize the device for this application.

To operate the addressable electrohologram, the device is suitably illuminated with coherent or incoherent light of suitable wavelengths, and the device electrodes are connected to a suitable electrical driving source of time-varying voltage. The coupling optics for illumination may consist of conventional lenses, mirrors, fiber-optic elements, polarizers, etc. to provide collimated, convergent, or divergent illumination. The driving electronics are any of a range of signal generators, pulse generators, alternating frequency power supplies, or sources of output signals generated by data processing apparatus and converted to suitable voltage levels. In experiments on the devices described herein, a Hewlett Packard frequency generator coupled to a broadband power amplifier and a toroidal impedance matching transformer (both of the latter manufactured by ENI, Inc.) were used to drive the devices. This driving electronics apparatus was capable of producing sine or square waves with output amplitudes up to 800 volts at frequencies from below 1 Hertz to several million Hertz.

In order to verify operability and high frequency performance of the AEH, various test patterns have been holographically produced or transferred to addressable electrohologram structures, including a holographic lens electrode test pattern (similar to a zone plate), a variable-pitch grating, and a hologram of a flower and vase. A parallel line (grating) structure with a variable pitch was required in order to test the relationship between the pitch of the electrodes (line width and spacing) and diffraction efficiency in these cell structures. In order to test the capability of the addressable electrohologram to reconstruct a more complex pattern, a transparency of a stylized flower and vase was prepared and recorded as a lensless Fourier hologram. Unlike the quasi-periodic line and space pattern produced for the variable-pitch electrode structure, this pattern is almost completely broken into relatively small disconnected structures. Cell evaluation focused on measuring a variety of parameters in order to determine the relationships between diffraction efficiency and cell structure, electrode spatial frequency and drive signal (amplitude & frequency).

Figure 4:
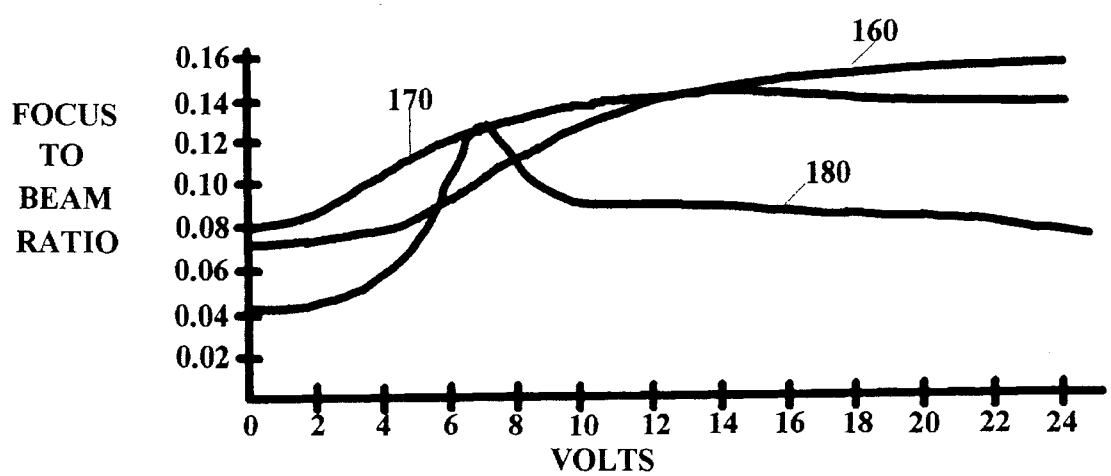
FIG. 4 is a chart illustrating effects of electrode spatial frequency observed in an addressable hologram.

FIG. 4 is a chart illustrating effects of electrode spatial frequency observed in an addressable hologram made in accordance with the present invention. The vertical axis is the ratio of the first-order diffracted beam power to the power of the undiffracted beam, where the beam diameter was small compared with the electrohologram pattern diameter (25 mm). The parameter represented by the three curves 160–180 is the pattern spatial frequency in three ranges: <100 cpm (160), 100 –300 cpm (170), and >300 cpm (180). It is apparent from FIG. 4 that for a given cell thickness, lower spatial frequencies require larger voltages to reach their maximum DE, while higher spatial frequencies reach maximum DE at lower voltages, and then their DE falls off with increasing voltage. The fall off at higher voltages is attributed to the effects of field fringing.

Optical measurements of the various test cells involved illumination at a wavelength of 632.8 nanometers with either a 1 millimeter diameter unexpanded laser probe beam or an expanded and collimated 10 millimeter diameter beam. Diffraction efficiency (DE) measurements compared the power of the undiffracted beam with the power of the first diffracted order. A United Detector Technology model 351 detector was used for all power measurements. In the case of the flower and vase hologram, a lens was used to collect the projected real image into the aperture of the detector. No effort was made to compensate for light lost by this lens in measuring diffraction efficiency. Thus the reported diffraction efficiencies are lower than the actual DE by a small percentage.

Drive voltage was applied to the test cells using a variable frequency signal source with a range from 0.1 Hz to 2.0 MHz. Drive voltage for each cell was adjusted for maximum DE at 100.0 Hz and then maintained at the same level for subsequent measurements of each cell. The electric field corresponding to this voltage ranged from 3.6 volts/micrometer of liquid crystal thickness to 15.1 volts/micrometer of liquid crystal thickness, depending on which cell design and liquid crystal material was used. The standard cell (structure of FIG. 1 ) required the lowest drive voltage, and the "T cell" (structure of FIG. 2) required the highest drive voltage with a given liquid crystal material.

Figure 5:
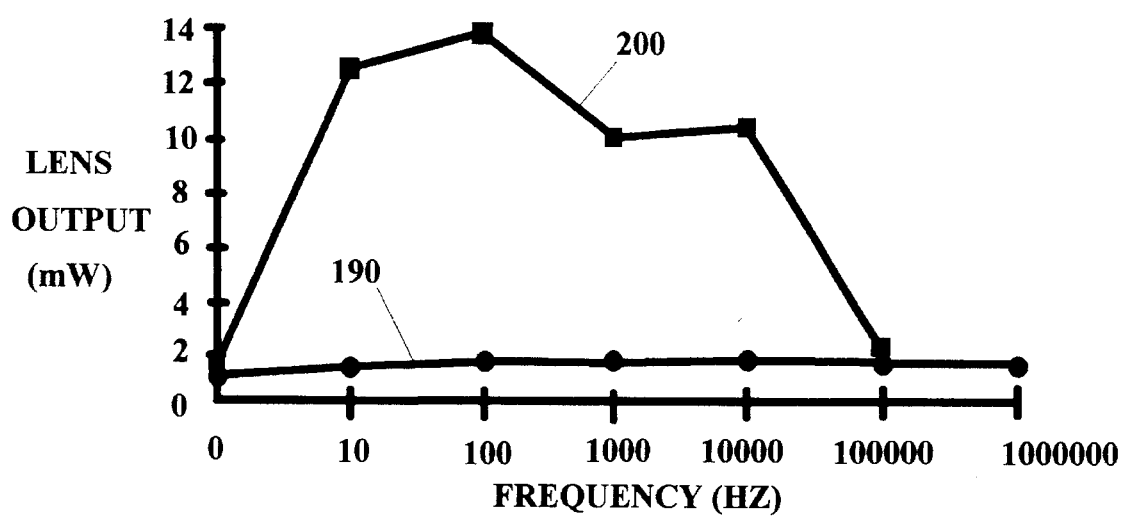
FIG. 5 is a chart illustrating frequency response curves observed in operation of an addressable hologram.

FIG. 5 shows the frequency response of the holographic lens addressable electrohologram (standard cell) across five decades of drive frequency. In FIG. 5, curve 190 corresponds to the zero-order (undeflected) beam, and curve 200 corresponds to the first order diffracted beam. This performance can be understood by the realization that the structure is in fact a large number of tuned RC circuits. Each individual hologram element, or "fringelet," is comprised of a conductive element with capacitance and resistance contributed by the liquid crystal between it and the counter-electrode. At its characteristic oscillation frequency the voltage in the cell increases relative to the surrounding material, thus increasing the alignment of the liquid crystal material between it and the cover electrode.

In tests of the "T" cell structure using even higher frequencies to bias a low frequency signal applied to one homogeneous electrode, this effect was found to have another characteristic. The "T" cell operation is limited (only at low frequencies) by the lack of an alignment layer in the sub-cell layer. However, with very high frequency bias another alignment mechanism comes into play, and the DE is characteristically higher than seen in even the standard or shielded cells, indicating a dual mode system.

Figure 6:
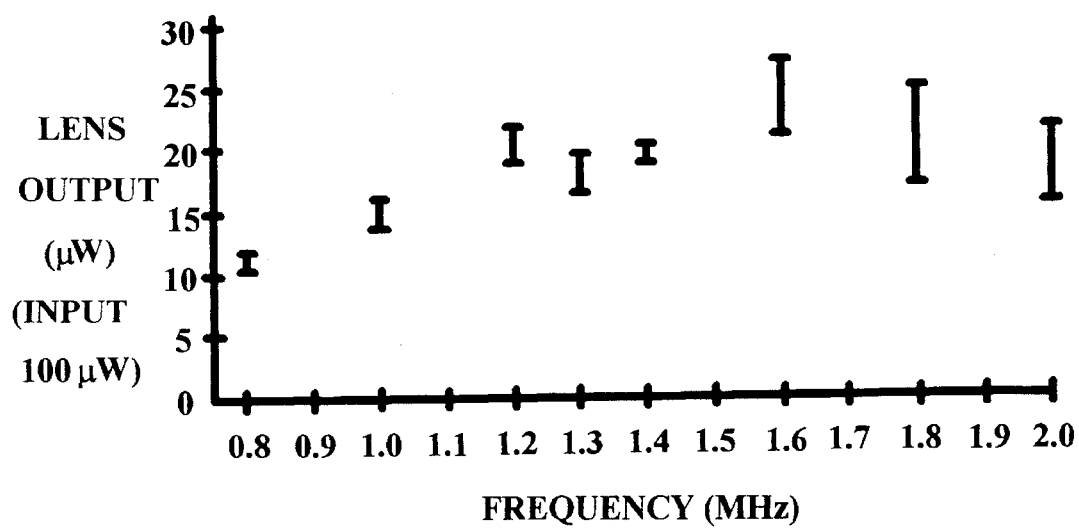
FIG. 6 is a chart illustrating a frequency response curve observed in operation of a preferred embodiment of an addressable hologram.

This performance is shown in FIG. 6, which shows frequency response in operation of the "T-cell" electrohologram lens up to 2 MHz. The high frequency performance may be attributed to an electrically induced alignment of the liquid crystal molecules parallel to the surface of the pattern at low frequency that is then forced into perpendicular alignment when the cell comes to resonance at the higher frequency. Regardless of the explanation, it is clear that the effect is of some importance in the design and operation of high speed liquid crystal AEH devices. If recorded as an off-axis hologram (which could place all of the diffracted light into the first order), this design would have approximately 45% diffraction efficiency with a switching time of less than 10 microseconds.

Performance of the flower/vase image hologram, measured by collecting the image light by means of a lens, was slightly lower than that of the variable-pitch grating cells or the holo-lens cells. At similar operating parameters the image hologram showed several percent less DE in every case.

Methods of Fabrication

Figure 7:
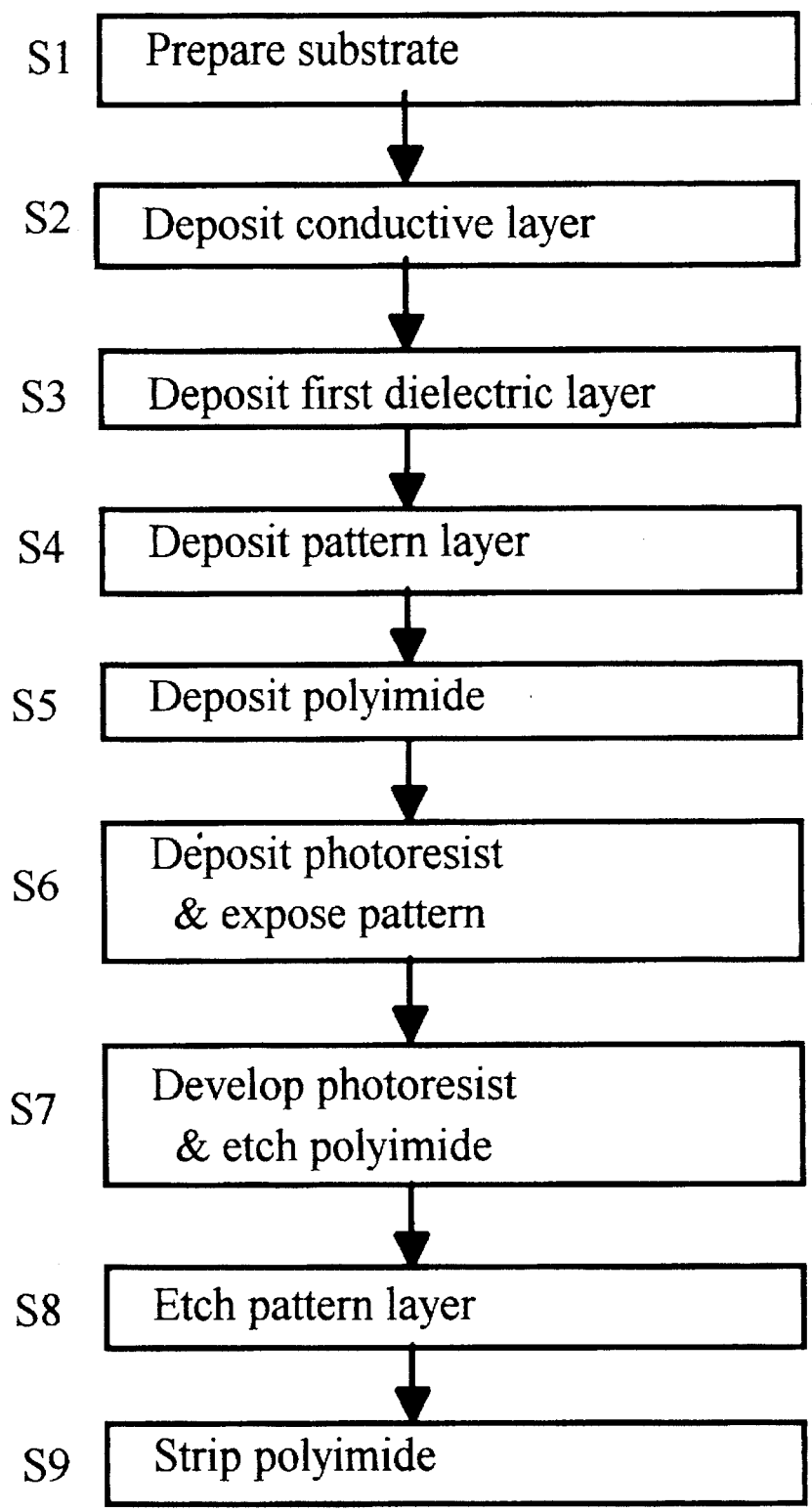
FIG. 7 is a schematic flow chart illustrating a partial sequence of fabrication method steps for an addressable hologram.
Figure 8:
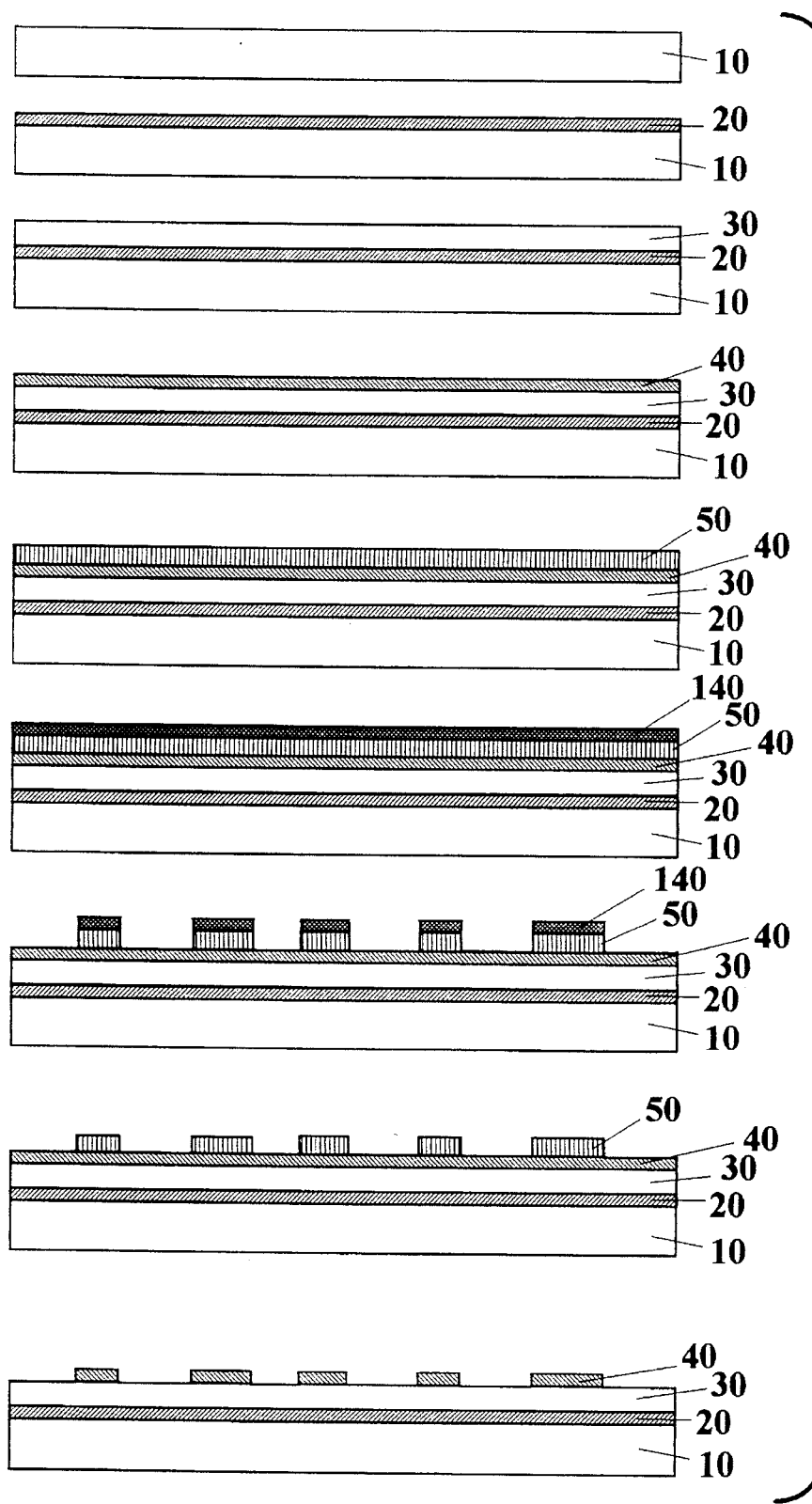
FIG. 8 is a series of cross-sectional views illustrating steps of a portion of fabrication methods for an addressable hologram.
Figure 9:
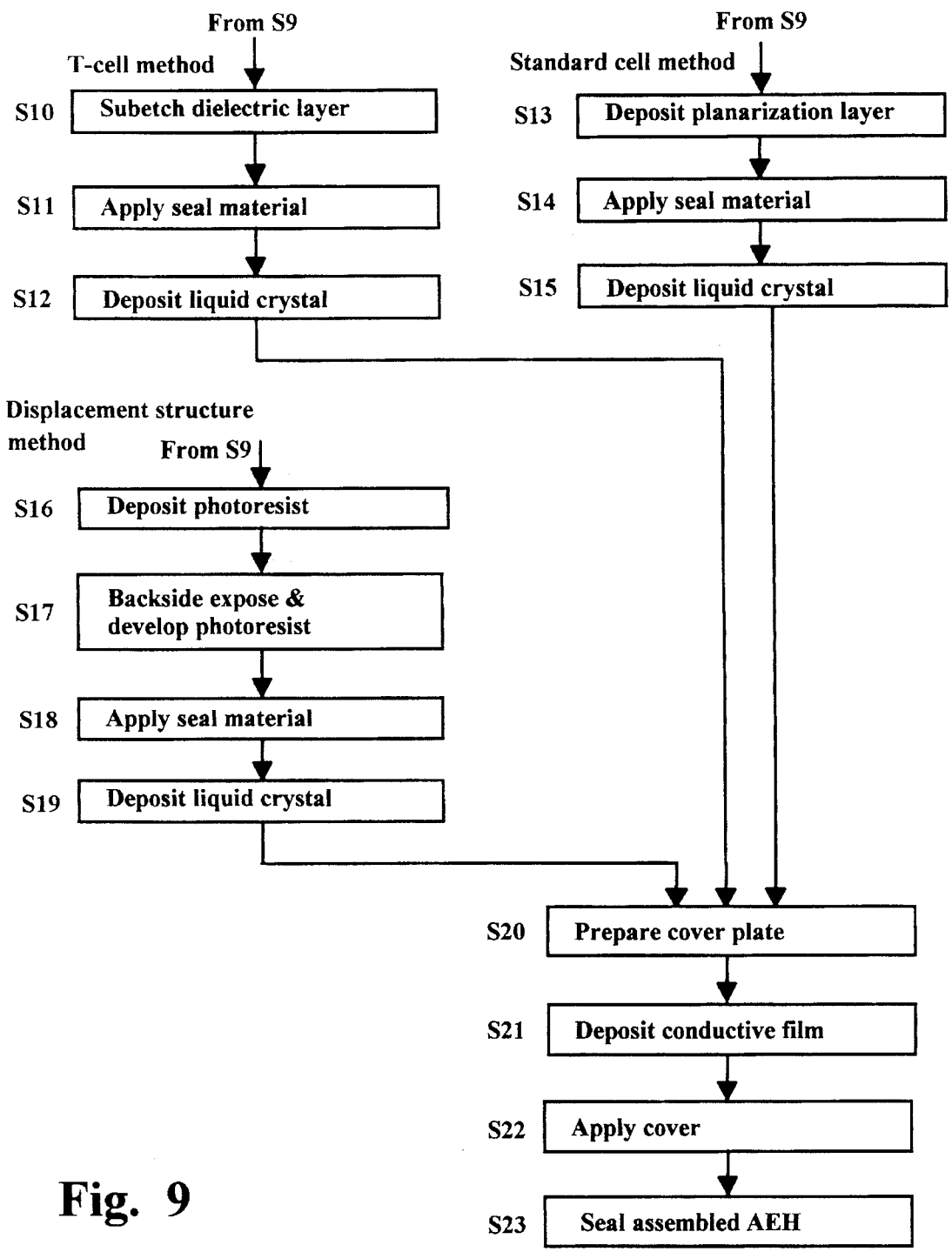
FIG. 9 is a schematic flow chart illustrating steps of portions of alternative fabrication methods.
Figure 10:
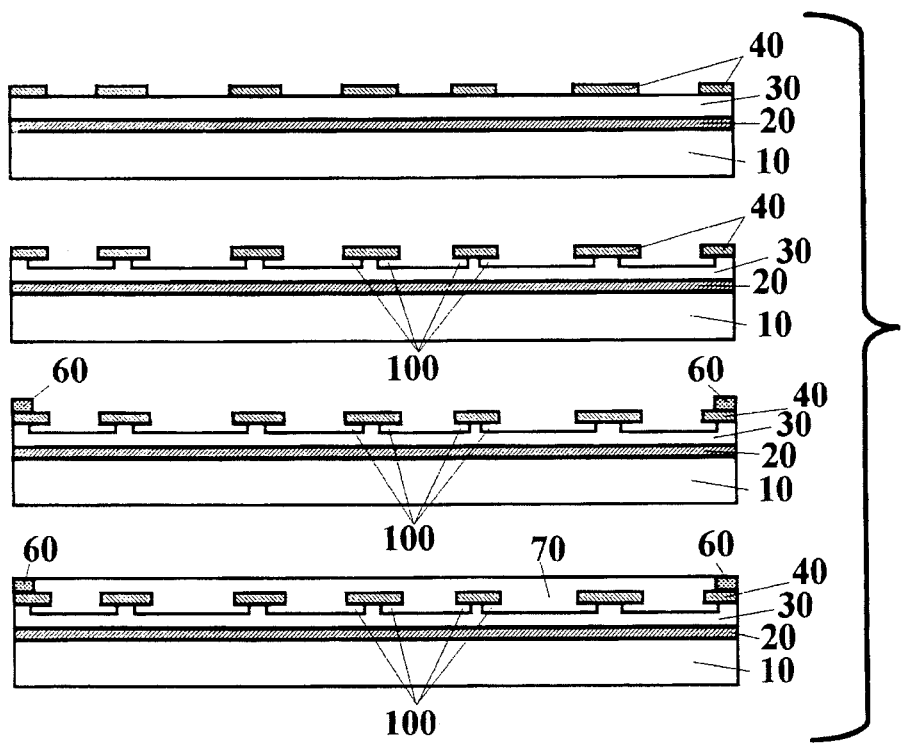
FIGS. 10, 11 and 12 are sets of cross-sectional views illustrating steps of portions of alternative fabrication methods for an addressable hologram
Figure 11:
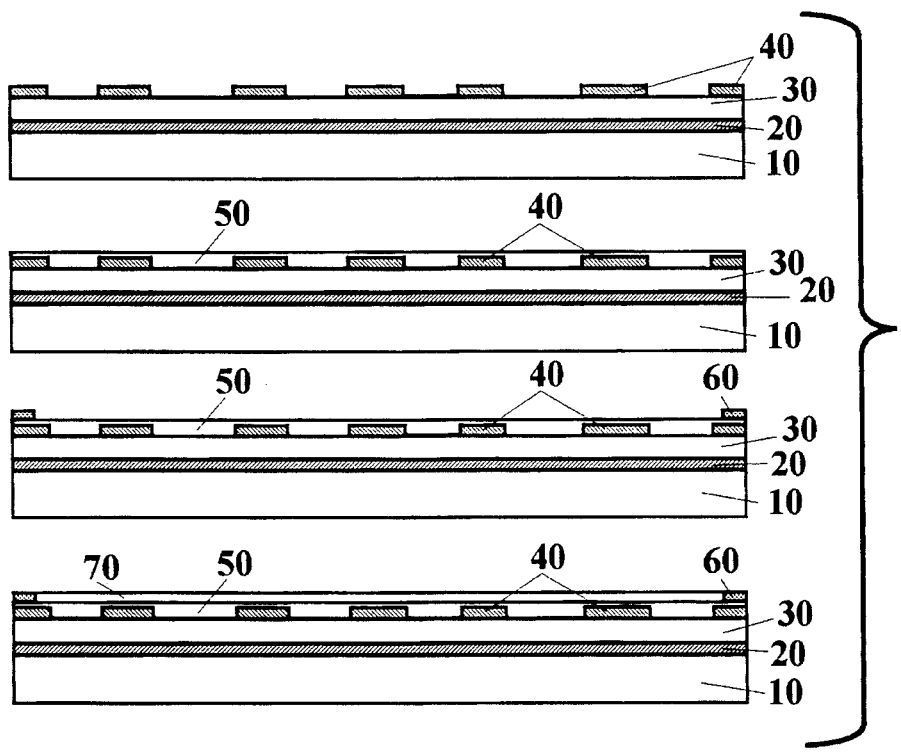
Figure 12:
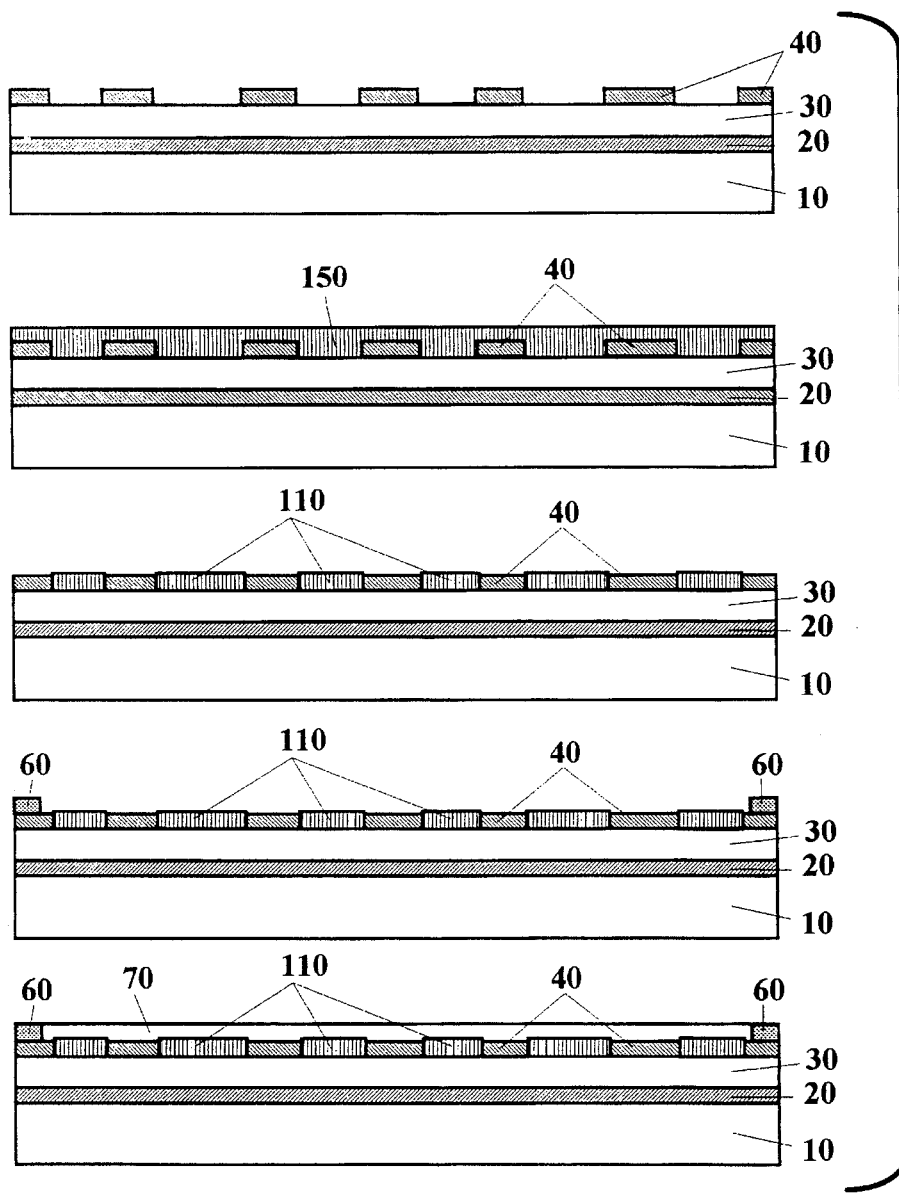

Methods of fabricating addressable electroholograms are described in this section, with reference to FIGS. 7, 8, 9, 10, 11 and 12. In FIGS. 7 and 9, steps of the fabrication methods are designated by S1, S2, . . . etc. FIG. 8 is to be read from top to bottom, illustrating with successive structures the outcomes of the steps of FIG. 7. FIG. 7 is a schematic flow chart illustrating a partial sequence of fabrication method steps for an addressable hologram. FIG. 8 is a series of cross-sectional views illustrating steps of the portion of fabrication methods shown in FIG. 7. FIGS. 7 and 8 illustrate the initial portion of fabrication methods common to the methods for fabricating various embodiments of an addressable electrohologram. It will be convenient to refer to FIGS. 7 and 8 together to understand the physical outcome of each step of the fabrication methods described. It will also be convenient to refer to FIG. 9 together with FIGS. 10, 11, and 12. FIGS. 9 through 12 illustrate various fabrication steps which differ among alternate embodiments of electroholograms described above. FIG. 9 is a schematic flow chart illustrating steps of portions of alternative fabrication methods, including the preferred method for fabricating a preferred embodiment with "T-cell" structures, and the preferred method for fabricating an embodiment with displacement structures. FIGS. 10, 11 and 12 are sets of cross-sectional views illustrating steps of portions of the alternative fabrication methods shown in FIG. 9 for an addressable hologram. FIGS. 10, 11, and 12 each start at the top with the structure shown at the bottom of FIG. 8.

Beginning with reference to FIGS. 7 and 8, the first step S1 is preparation of a suitable substrate 10, including cleaning the substrate in preparation for deposition of a conductive layer 20. Substrate base layers are chosen for flatness, optical uniformity, chemical resistance and mechanical stability during processing operations. Because of the thin layers utilized for the modulating materials, flatness is a prime requirement of all rigid layers. Selected "master grade" polished photo mask blanks have been used as the substrate for most test cells. Particular attention is paid to the uniformity of the ITO coating and to the surface conditions of the substrate that may affect this first layer of ITO as well as subsequent layers. A suitable substrate preparation process was described in the present inventor's article in SPIE Proceedings 1667 *Practical Holography VI* (1992) (mentioned above), which is incorporated herein by reference.

Continuing with reference to FIGS. 7 and 8, the next step S2 is deposition of a thin layer 20 of transparent conductive material such as ITO. Then in step S3 a layer of dielectric 30 is deposited. Step S4 comprises deposition of a thin conductive layer 40 of material such as ITO to be patterned with a hologram pattern. Layer 40 is substantially planar. Step S5 comprises deposition of a thin layer 50 dielectric material, which may be a polyimide material for example. In step S6, a negative photoresist layer 140 is deposited, and (if necessary) baked, and then exposed. The photoresist deposition may be done by any of the processes conventionally used in semiconductor wafer fabrication processes, such as spinning on of the photoresist, etc. The exposure in step S6 may be through a mask carrying the desired hologram pattern, or preferably may be done by holographic lithography, creating the hologram in photoresist layer 140 m situ. Alternatively, the mask used for step S6 may be generated holographically in a separate operation. In step S7, photoresist layer 140 is developed and (if necessary) baked, and layer 50 is etched. The unetched portions of layer 50 act as a mask for etching pattern layer 40 in step S8. Step S9 comprises stripping of the remaining portions of layer 50. Step S9 completes the portion of this fabrication process that is common to all embodiments. At this point in all fabrication methods described here, pattern layer 40 carries a hologram pattern, as illustrated in the lower part of FIG. 8. All of the individual fringe elements of patterned layer 40 are coplanar.

Referring now to FIGS. 9 along with FIGS. 10, 11, and 12, the following steps differ according to the desired embodiment of an addressable electrohologram structure. If the preferred embodiment "T-cell" structure of FIG. 2 is desired, the next step after S9 is step S10 in which an isotropic etch is used to subetch dielectric layer 50 under a substantial portion of the undersides of transparent pattern elements of layer 40, resulting in a structure with a T-shaped cross-section consisting of a pattern element top supported by a thin pedestal of dielectric 50. The subetched portions correspond to subetch regions 100 as illustrated in FIG. 2 and FIG. 10. Then seal material 60 is applied in step S11 to the periphery of the AEH, surrounding at least the area patterned earlier. In fabricating this embodiment, the next step is S12, in which a liquid crystal material 70 is deposited to fill the spaces 100 etched under pattern elements 40 and to cover the tops of those pattern elements. The resultant structure cross-section is shown in the lower part of FIG. 10. This embodiment is then ready to be covered as described below for all versions.

Alternatively, if the desired embodiment is the simpler structure shown in FIG. 1 referred to herein as a "standard cell," the fabrication steps are slightly different, as shown in FIG. 9 and FIG. 11. The fabrication step after step S9 is deposition of a planarization layer in step S13. This is followed by step S14, application of seals 60 as described above in step S11, and then by step S15, deposition of liquid crystal material as in step S12. The structure cross-sections resulting from these steps are shown in FIG. 11.

Referring now to FIG. 9 together with FIG. 12: In fabricating the third embodiment of FIG. 3 (with displacement structures), the step following S9 is step S16, application of negative photoresist 150 over layer 40 and the exposed portions of dielectric 30. Then photoresist layer 150 is exposed (step S17) through the back side of substrate 10 and layer 150 is developed. This exposure is done through substrate 10, conductive layer 20 and dielectric layer 30. Photoresist layer 150 may be pre-baked and/or post-baked if needed for the particular photoresist used. After exposure/development step S17, the remaining developed photoresist 150 forms a set of displacement spacers 110 as illustrated in FIG. 3 and FIG. 12. It will be apparent that various alternative materials of suitable refractive index can be substituted for photoresist in forming displacement spacers 110, with minor variations in the fabrication steps. Step S17 is followed by step S18, application of seals 60 as in steps S11 or S14. Then step S19, deposition of liquid crystal material 70 (as in steps S12 or S15) brings this embodiment to the same state as other embodiments, ready for covering.

For any of the embodiments, a cover is prepared from a flat transparent quartz or other glass plate 90, prepared in step S20 and coated in step S21 with a thin conductor 80. High-quality ITO-coated LC-display-grade glass with flatness of less than a quarter micron over the cell diagonal is individually selected for use as the cover. In step S22, cover 90 with its coating 80 is applied over liquid crystal material 70, and seals 60, and sealed. The resultant structure cross-sections are as shown in FIGS. 1, 2, or 3 for the three embodiments described.

It will be appreciated by those skilled in the art that the sequence of steps as described above may be varied in some details without departing from the spirit and scope of the methods as defined in the appended claims. For example, the cover 90 can be prepared with an integral edge spacer and seal, and assembled to the device before applying electro-optic material 70 through a small gap in the seal, and then finally sealed at that gap.

Having described my invention, I claim:

1. An electrically addressable holographic element in which information is recorded as a holographic pattern of electrically conductive material having first and second sides, said element having two or more conductive electrodes spaced apart from said first and second sides by dielectric layers, at least one of said conductive electrodes being substantially transparent and at least one of said dielectric layers comprising an electro-optic material responsive to an electric field between said electrodes by a change in refractive index to affect reconstruction of said information by light incident upon said element.

2. An electrically addressable holographic element as in claim 1, wherein said electrically conductive material of said holographic pattern comprises a substantially transparent film of a material selected from the list consisting of tin oxide, indium-doped tin oxide, indium oxide, gold, silver, silver oxide, platinum, palladium, and rhodium.

3. An electrically addressable holographic element as in claim 1, wherein at least one of said dielectric layers comprises a substantially transparent material with refractive index substantially matching the refractive index of said patterned electrically conductive material.

4. An electrically addressable holographic element as in claim 1 wherein at least one of said dielectric layers comprises a hydrogenated silicon nitride film and said patterned electrically conductive material comprises an indium-doped tin oxide film.

5. An electrically addressable holographic element as in claim 1 wherein at least one of said dielectric layers comprises a tantalum pentoxide film and said patterned electrically conductive material comprises a tin oxide film.

6. An electrically addressable holographic element as in claim 1 wherein said holographic pattern of electrically conductive material comprises a multiplicity of electrically discontinues films.

7. An electrically addressable holographic element as in claim 1 wherein at least a portion of said holographic pattern has a spatial frequency of more than about 100 cycles per millimeter.

8. An electrically addressable holographic element as in claim 1 wherein said electro-optic material is a liquid crystal.

9. An optical output device comprising a multiplicity of addressable electroholograms as in claim 1.

10. An optical output device as in claim 9, wherein said multiplicity of addressable holograms is arranged in a coplanar array.

11. An optical output device as in claim 9, wherein said multiplicity of addressable holograms is arranged in a stack.

12. An electrically addressable wavefront-modulating device comprising
   (a) a patterned film of electrically conductive material having first and second sides,
   (b) two or more conductive electrodes spaced apart from said first and second sides by dielectric layers, at least one of said conductive electrodes being substantially transparent and at least one of said dielectric layers comprising an electro-optic material responsive to an electric field between said electrodes by a change in refractive index to affect wavefront modulation of light incident upon said device in accordance with said patterned film of electrically conductive material.

13. An electrically addressable wavefront-modulating device as in claim 12, wherein said patterned film of electrically conductive material comprises a substantially transparent film of a material selected from the list consisting of tin oxide, indium-doped tin oxide, indium oxide, gold, silver, silver oxide, platinum, palladium, and rhodium.

14. An electrically addressable wavefront-modulating device comprising in combination,
   a) a first substantially transparent substrate having a first surface,
   b) a first substantially transparent electrically conductive film on said first surface and having a first electrode contact,
   c) a first substantially transparent dielectric film on said first electrically conductive film,
   d) a second electrically conductive film having a first refractive index and selectively covering said first dielectric film with a pattern,
   e) a layer of electro-optic material covering said second electrically conductive film,
   f) a third electrically conductive film covering said layer of electro-optic material and having a second electrode contact,
   g) electric field applying means connected to said first and second electrode contacts so as to cause said layer of electro-optic material to vary in refractive index, selectively affecting wavefront modulation of light incident upon said device.

15. An electrically addressable wavefront-modulating device as in claim 14, wherein said electro-optic material is a liquid crystal.

16. An optical output device comprising a multiplicity of addressable wavefront-modulating devices as defined in claim 14.

17. An optical output device as in claim 16, wherein said a multiplicity of addressable wavefront-modulating devices is arranged in a coplanar array.

18. An optical output device as in claim 16, wherein said a multiplicity of addressable wavefront-modulating devices is arranged in a stack.

19. An electrically addressable wavefront-modulating device as in claim 14, further comprising a second substantially transparent dielectric film having a second refractive index substantially equal to said first refractive index and located between said second electrically conductive film and said layer of electro-optic material.

20. An electrically addressable wavefront-modulating device as in claim 19, wherein said second substantially transparent dielectric film and said layer of electro-optic material comprise a single film wherein said second refractive index is a refractive index of said electro-optic material.

21. An electrically addressable wavefront-modulating device as in claim 14, further comprising a substantially transparent cover covering said layer of electro-optic material and said third electrically conductive film.

22. A method of fabricating electrically addressable electroholograms, comprising the steps of
   a) preparing a transparent substrate having first and second sides,
   b) depositing a first transparent conductive film upon said first side of said substrate,
   c) selectively depositing a first transparent dielectric film on said conductive film, leaving a portion uncovered to define a first electrode,
   d) depositing a second transparent conductive film,
   e) depositing a film of photoresist,
   f) exposing said photoresist with a holographic pattern,
   g) developing said photoresist,
   h) etching said second conductive film to define said holographic pattern,
   i) applying an electro-optic layer covering said second electrically conductive film,
   j) preparing a third transparent electrically conductive film and placing said third conductive film over said electro-optic layer.

23. A method of fabricating electrically addressable electroholograms as defined in claim 22, wherein step (h) comprises the substeps of
   A) etching said second transparent dielectric film and said second conductive film with anisotropic etch means, and
   B) etching said first dielectric film with an isotropic etchant to subetch under at least a portion of said holographic pattern.

24. A method of fabricating electrically addressable electroholograms as defined in claim 22, comprising the additional steps after step (h) of
   A) depositing photoresist over said holographic pattern,
   B) exposing said photoresist through said second side of said substrate,
   C) developing said photoresist.

25. A method of fabricating electrically addressable electroholograms as defined in claim 22, wherein step (f) comprises exposing said photoresist through a mask carrying said holographic pattern.

26. A method of fabricating electrically addressable electroholograms as defined in claim 22, wherein step (f) comprises exposing said photoresist by holographic lithography.

27. A method of fabricating electrically addressable electro-holograms as defined in claim 22, comprising after step d) the additional step of
   k) depositing a second transparent dielectric film.

28. A method of fabricating addressable electro-holograms as defined in claim 22, comprising the additional steps of
   k) preparing a cover, said cover comprising a second transparent substate having a first surface,
   l) placing said cover over said electro-optic film, and sealing said cover with said first transparent substrate to define a sealed area containing said electro-optic film.

29. A method of fabricating electrically addressable electro-holograms as defined in claim 28 wherein the step i) further comprises placing said third conductive film on said first surface of said cover and wherein said third conductive film has a second electrode; and wherein the step l) further comprises disposing the cover so as to locate said third conductive film over said electro-optic layer, leaving at least a portion of said second electrode outside of said sealed area.

* * * * *